Oct. 10, 1967 J. P. BIET 3,346,802

CONTROL AND REGULATION DEVICE INCLUDING A SEMICONDUCTOR OF SYMMETRICAL BLOCKING-UNBLOCKING TYPE

Filed Aug. 5, 1964

INVENTOR
Jean Pierre Biet
By Paul M. Craig, Jr.
ATTORNEY

United States Patent Office 3,346,802

Patented Oct. 10, 1967

3,346,802

CONTROL AND REGULATION DEVICE INCLUDING A SEMICONDUCTOR OF SYMMETRICAL BLOCKING-UNBLOCKING TYPE

Jean Pierre Biet, Saulx-les-Chartreux, France, assignor to Compagnie Generale d'Electricite, Paris, France, a corporation of France Filed Aug. 5, 1964, Ser. No. 387,705
Claims priority, application France, Aug. 6, 1963, 943,896
12 Claims. (Cl. 323—4)

The present invention relates to a control and regulation device including a semiconductor of symmetrical blocking-unblocking type. This control and regulation device can be applied to any electrical circuit in which the current has to be put on and off according to the value of certain parameters defining the work of a load inserted in this circuit. Such a semiconductor component has already been described in a patent application made in the United States in the name of this applicant under No. 367,470 on May 14, 1964, and corresponding to French priority of May 14, 1963. This semiconductor component includes at least four junctions each between two semiconductor layers of opposite conduction type a single control electrode being connected to a median layer by a connection consisting in a resistive contact which comprises a semiconductor layer of the same type as that of said median layer; this semiconductor layer consists in two successive zones one of medium doping, touching the median layer, the other of high doping in contact with a control electrode, the outer layers of said component being respectively connected to two electrodes called main electrodes.

It is however to be understood that the realization of the control and regulation device according to the invention is not limited to the application of the semiconductor device described in the above mentioned applicant's patent application; the present invention can be performed with any semiconductor element of the symmetrical blocking-unblocking type i.e. which can be rendered conductive for a direct current, in either direction, by means of a negative polarity control pulse applied to a single control electrode, and unconductive by applying of a positive polarity control pulse.

The object of the present invention is to provide a control and regulation device including a semiconductor component of the symmetrical blocking-unblocking type the single control electrode of which is connected to one of the terminals of a signal generating device through a resistance, the second terminal being connecting to two main electrodes of said component, respectively through two rectifiers the passing direction of which is directed to said main electrodes, said signal generating device including a transformer the core of which is made of quasi-rectangular hysteresis curve magnetic material, this signal generating device being synchronized with the alternating current source, supplying the circuit in which is inserted the semiconductor component, and being controlled by a regulation device responsive to the parameter defining the work of a load inserted in said circuit.

A further object of the present invention is to provide a control and regulation device in which the transformer includes a secondary winding the terminals of which are the output terminals of said signal generating device, a first primary winding connected to the terminals of an auxiliary signal generator synchronized with the alternating current source, a second primary winding connected to a detector responsive to the parameters of the load inserted in said circuit.

Other characteristics and features of the invention will appear in the following description. For its full understanding, reference can be made to the attached drawings given only for descriptive purpose, in which.

Figure 1:
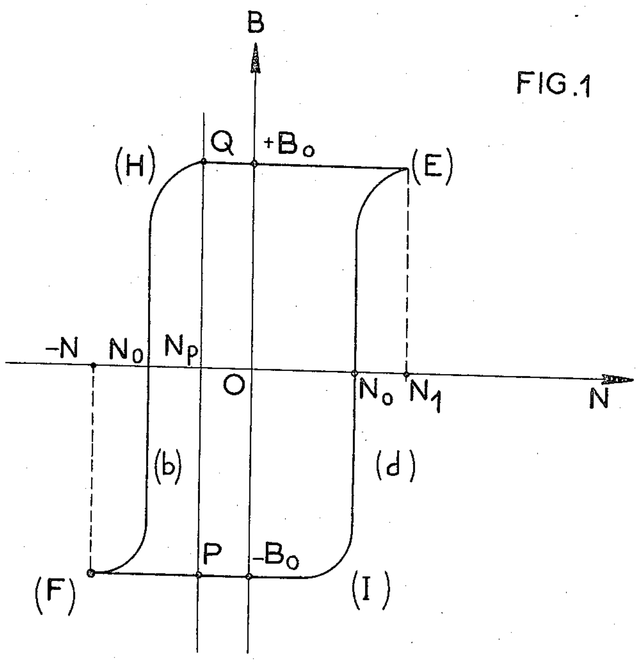
FIG. 1 is the quasi-rectangular hysteresis curve of the magnetic material used on the transformer of the device of the invention.

The curve on FIG. 1 points out the relation between the magnetic field (in ampere-turns) and the flux density (in gauss) of a magnetic material the hysteresis curve of which presents quasi-rectangular characteristics.

This material presents in definite balance condition a flux density $-B_0$ represented on the curve by the figurative point $P_0$. When the magnetic field applied to this material varies the corresponding variation of the flux density is defined by the new position of the point P, position which does not only depend on the instantaneous value of the magnetic field but also on its variations since its latest value. So if we apply to the material, which has in the absence of external magnetic field a magnetization defined by the flux density $-B_0$, a magnetic field increasing from zero to N and then decreasing until zero, the point representing the magnetic induction will move from P to E along the right part *d* of the curve.

When the magnetic field is equal to zero again, the point representing the flux density will be on position Q corresponding to a remanent flux density $+B_0$. So the polarity of the remanent flux density changes when the magnetic core is placed in a magnetic field of a value of zero at the beginning reaching a maximum and decreasing again to zero.

This particularity will be expressed below by saying that a positive pulse of the magnetic field (i.e. of the electric current creating the electric field) inverses the polarity of the balance flux density which passes from $-B_0$ to $+B_0$. 1 shows that this inversion of polarity is possible only if the figurative point reaches the extreme position (E) of the hysteresis curve which implies that the magnitude of the pulse of the magnetic field must be at least equal to a value $N_1$ corresponding to position E of the figurative point.

In the same way, FIGURE 1 shows that a negative electric field pulse (or of current which creates it) has for effect, if the magnitude is sufficient, to inverse again the polarity of the flux density which passes from $+B_0$ to $-B_0$.

So an alternate succession of positive and negative electric field pulses applied to a magnetic core will rock the magnetic induction between $-B_0$ and $+B_0$, this rocking having the same rhythm as the magnetic field pulses.

Figure 2:
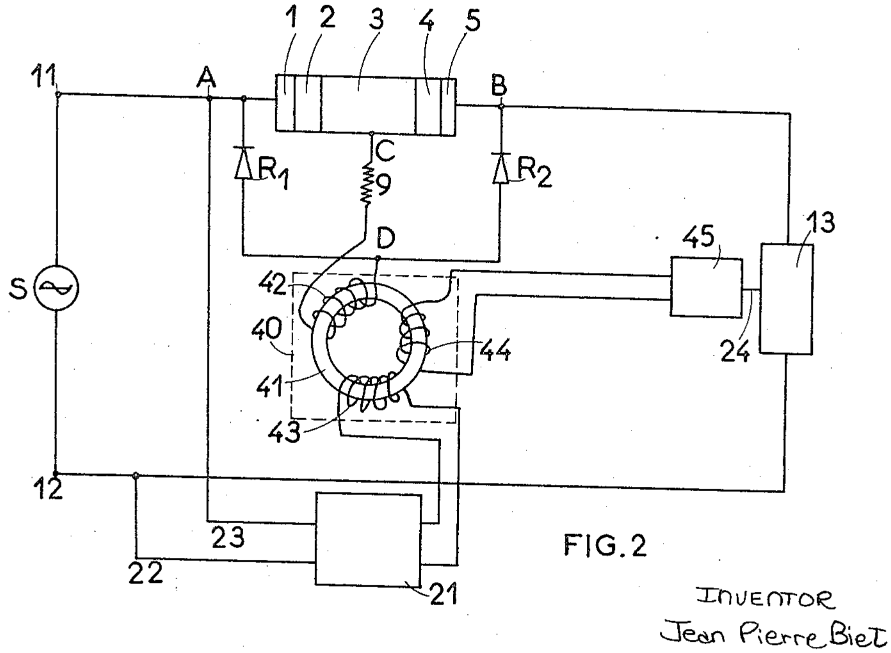
FIG. 2 is a diagram of a device according to the invention.

FIGURE 2 shows a diagram of a recommended type of realization of the device according to the invention. A semiconductor component of blocking-unblocking type is schematically represented in ACB, A being a first main electrode, B a second main electrode and C being a control electrode. Such semiconductor component can be made conductive or unconductive for a current flowing from A toward B or from B toward A according to the various values of the potential differences respectively applied to the electrodes A and C, B and C. Referring to FIGURE 2, the blocking-unblocking component includes for example, five layers referenced 1, 2, 3, 4 and 5, separated by four junctions.

The electrode A is connected to one terminal 11 of an alternating current source S, the other terminal 12 and the electrode B being connected to the input terminals of a load 13.

The electrodes A and B are connected to a point D through two diodes $R_1$ and $R_2$ inserted in such manner that the current may pass from D to A and from D to B.

A transformer schematically represented in 40 includes a magnetic core 41 made of a material which has a quasi-rectangular hysteresis curve (same type of curve as on FIGURE 1) and three windings 42, 43 and 44.

The terminals of winding 42 are respectively connected to the control electrode C through a resistance 9, and to the point D.

The terminals of winding 43 are connected to the input of a device 21 which is an auxiliary signal generator. Conductors 22–23 connecting terminals 12–11 of the alternating current source C to the terminals of generator 21 schematically represent the alternating current supply and the synchronization between said generator and said source.

The terminals of winding 44 are connected to the output of a detector or regulation device 45, the purpose of which is to send a control current called inhibition current the value of which depends upon working conditions of load 13.

As a non limitative example, load 13 can be the resistance of a thermostat set for working at a fixed temperature. As soon as the temperature increases beyond this fixed limit, the regulation device 45 will send an inhibition current into winding 44. This inhibition current will cause the figurative point P (FIGURE 1) to move to a position such as the magnitude of the pulses no longer enable the figurative point to get over the bend I or H of the curve. Then there will be no rocking of polarization of the transformer, and the component ACB is made unconductive.

The connection between the device 45 and load 13 has been schematically represented on FIGURE 2 by the line 24. Contrarily to this example, the control of the regulation device 45 may also, in the device according to the invention, be manual.

Before studying the functioning of the device as a whole, it is necessary to understand the control principle of the blocking and unblocking of the component AB by means of the transformer 40 the core of which presents quasi-rectangular hysteresis curve.

A magnetic field pulse applied to the core of this transformer causes the rocking of the flux density from $-B_0$ to $+B_0$, the variation of this flux density inducing an electromotive force in the winding 42, the curve of this electromotive force having a shape similar to that of the magnetic field pulse but an opposite polarity. The magnetic field pulse being positive the electric pulse at the terminals of winding 42 will therefore be negative.

As it has been shown in the description of FIG. 1, an alternating series of magnetic field pulses will produce an alternating series of electric current pulses in the circuit of the winding 42. If a direct magnetic biasing field is applied to the core, the working point will move along the curve (FIG. 1) to the point corresponding to the magnetic field Np. The negative pulses will be added to the biasing magnetic field while the positive pulses will be subtracted and the working point will not move over the bend I of the curve. Hence, the direct magnetic biasing field prevents the rocking of flux density and no more current pulses will be induced in the circuit of winding 42.

Voltage pulses applied between points D and C turn on or off the component ACB, according to the polarity of said pulses. A series of alternate polarity pulses, synchronized with the alternating current supplying the circuit in which the component is inserted, may enable the normal passage of the current during some fraction of each alternation. These pulses are induced in the winding 42 by the rocking of the flux density from one to another of its extreme values $-B_0$, $+B_0$. To control the variation of the flux density, magnetic field pulses are applied to the core by means of a control winding 43 connected to the terminals of the generator 21 synchronized with the source S.

In these normal conditions, the component ACB let the alternating current feed the load 13. The generator 21 is set in such way to assure the passage of the current during a certain fraction of the alternation, this defining the power sent to the load. Accordingly, the power delivered to the load 13 can be stabilized at a predetermined value which depends on the adjustment of generator 21.

The regulation device 45 ensures the supply of winding 44 with direct current, called "inhibition current," producing the direct magnetic biasing field. This current is sent according to the need which can be defined by the values of the different working parameters of the load. This regulation device can be manual as well as automatic. As described above, the inhibition current producing the biasing magnetic field displaces the working point along the hysteresis curve. A predetermined value $I_0$ of this current corresponds to a position of the working point which does not allow the rocking of the flux density and the component is turned off. When there is no inhibition current passing through winding 44 the signal generator 21 works normally and the component is turned on. In the case of a load such as a thermostat adjusted to work at predetermined temperature, the regulation device can be a thermocouple the current of which is amplified by means of a direct current amplifier. If the temperature of the thermostat does not correspond to a fixed temperature, the thermocouple current reaches a value which turns off the component ACB, the thermostat being not supplied with alternating current until the temperature comes back to the right value.

It is obvious that the example of a thermostat has been given with only descriptive purpose, the control and regulation device of the invention being able to be applied to any load on which the current has to be regulated.

The device of the invention presents another advantage: it is possible to have more than one primary winding such as winding 44, each of such windings being connected to various regulation devices such as 45. Such arrangement is of interest when there are two or more independent parameters, the value of which has to be considered in connection with the work of the load. Thus the device of the invention may include a regulation device which includes a detector responsive to the temperature of the component ACB itself, connected to a supplementary primary winding, such circuit being able to prevent any damage to the component which may be produced by any overvoltage or any abnormally high current.

What I claim is:

1. Control and regulation circuit including a symmetrically conducting, gate controlled turn-on and turn-off semiconductor device of the triggered avalanche conducting type having a single control electrode, the single control electrode being connected to one of the output terminals of a signal generating device through a resistance, the second output terminal of the signal generating device being connected to the two main electrodes of said semiconductor device respectively through two rectifiers the passing direction of which are directed to the main electrodes, said signal generating device including a transformer the core of which is made of a quasi-rectangular hysteresis curve material, the signal generating device being synchronized with the alternating current source supplying the circuit which includes the semiconductor device, and being controlled by means of a regulation device responsive to the parameters defining the work of the load inserted in said circuit.

2. Control and regulation circuit according to claim 1 in which the transformer includes a secondary winding the terminals of which are the output terminals of said signal generating device, a first primary winding connected to the terminals of an auxiliary signal generator synchronized with the alternating current source, and a second primary winding connected to a detector responsive to the working parameters of the load inserted in said circuit.

3. Control and regulation circuit according to claim 2, in which the terminals of said detector are connected to the terminals of said second primary winding through a direct current amplifier.

4. Control and regulation circuit according to claim 2, in which the current of said second primary winding is manually regulated.

5. Control and regulation circuit according to claim 2, in which the regulation device delivers a direct current the value of which is a function of the average value of the parameters defining the work of the load.

6. Control and regulation circuit according to claim 5, in which the load is a thermostatically controlled load aid the regulation device is a thermocouple the current of which is amplified by means of a direct current amplifier.

7. Control and regulation circuit according to claim 6, in which the transformer includes further secondary windings, one of them being connected to the terminals of a regulation device responsive to the temperature of the semiconductor device itself.

8. An alternating current control and regulation circuit comprising a symmetrically conducting, gate controlled turn-on and turn-off semiconductor device of the triggered avalanche conducting type having a single control electrode, said semiconductor device having its main electrodes operatively connected in circuit relationship with an alternating current supply for controlling current applied to a load, a control pulse generating circuit having its output operatively coupled to the single control electrode of the semiconductor device, said control pulse generating circuit serving to provide opposite polarity control pulses to the control electrode for causing the semiconductor device to turn-on and turn-off for controlled conduction intervals independently of the supply alternating current, and means for synchronizing the control pulse generating circuit with the alternating current supply.

9. A circuit according to claim 8 wherein the control pulse generating circuit comprises a transformer having a core made of a magnetic material having a quasi-rectangular hysteresis curve and at least three windings including one triggering winding connected to the output of a signal generator synchronized with the half-cycles of said alternating current supply, a single output winding having one terminal connected to the main electrodes of the semiconductor device respectively through two rectifiers and the other terminal connected to said single control electrode through a resistor, and at least one regulation winding connected to a direct current source for controlling the current passing through said semiconductor device by biasing said magnetic core.

10. A circuit according to claim 9 wherein said direct current supply source includes current regulator means responsive to the working parameters of said load.

11. A circuit according to claim 10 wherein said current regulator means comprise a detector means responsive to the heat generated within said load.

12. A circuit according to claim 9 wherein said direct current supply source includes current regulator means controlled by a temperature detector means associated with said semiconductor device.

References Cited

UNITED STATES PATENTS

| | | | |
|---|---|---|---|
| 3,188,490 | 6/1965 | Hoff et al. | 307—88.5 |
| 3,196,330 | 7/1965 | Moyson | 317—235 |
| 3,202,871 | 8/1965 | Shelar | 307—88.5 |
| 3,205,404 | 9/1965 | Manoru Kurata et al. | |
| 3,243,711 | 3/1966 | King et al. | 307—88.5 |

OTHER REFERENCES

Mungenast, AC Motor Speed Control, Home Appliance Builder, August 1964, pp. 12–15, 38.

JOHN F. COUCH, *Primary Examiner.*

M. L. WACHTELL, *Assistant Examiner.*